(12) United States Patent
Udd

(10) Patent No.: US 8,061,230 B2
(45) Date of Patent: Nov. 22, 2011

(54) ARRANGEMENT FOR THE CONTROL OF A GEAR BOX

(75) Inventor: Jonas Udd, Stockholm (SE)

(73) Assignee: Scania CV AB (publ) (SE)

( * ) Notice: Subject to any disclaimer, the term of this patent is extended or adjusted under 35 U.S.C. 154(b) by 622 days.

(21) Appl. No.: 12/280,871

(22) PCT Filed: Mar. 1, 2007

(86) PCT No.: PCT/SE2007/050123
§ 371 (c)(1),
(2), (4) Date: Sep. 12, 2008

(87) PCT Pub. No.: WO2007/120106
PCT Pub. Date: Oct. 25, 2007

(65) Prior Publication Data
US 2009/0013815 A1    Jan. 15, 2009

(30) Foreign Application Priority Data
Mar. 3, 2006  (SE) ...................... 0600476

(51) Int. Cl.
*B60K 17/04* (2006.01)
(52) U.S. Cl. ............... 74/473.12; 74/473.36; 310/12.01
(58) Field of Classification Search ............... 74/473.12, 74/473.36, 473.37; 310/12.01, 14
See application file for complete search history.

(56) References Cited

U.S. PATENT DOCUMENTS

| | | | |
|---|---|---|---|
| 4,563,602 A | 1/1986 | Nagasaka | 310/12 |
| 6,834,562 B2 * | 12/2004 | Esly et al. | 74/335 |
| 2002/0189388 A1 | 12/2002 | Suzuki | |
| 2004/0116229 A1 | 6/2004 | Norum | 475/149 |
| 2004/0212279 A1 * | 10/2004 | Williams et al. | 310/328 |
| 2007/0222303 A1 * | 9/2007 | Nishimura | 310/12 |

FOREIGN PATENT DOCUMENTS

| | | |
|---|---|---|
| DE | 10213724 A1 | 1/2003 |
| EP | 0545597 A1 | 6/1993 |
| GB | 2 368 105 A | 4/2002 |
| JP | 63-95848 | 4/1988 |
| JP | 3-78144 | 4/1991 |
| JP | 5-3650 | 1/1993 |
| JP | 5-82998 | 4/1993 |

(Continued)

OTHER PUBLICATIONS

International Search Report dated Jun. 8, 2007, issued in corresponding international application No. PCT/SE2007/050123.
English translation of Japanese Office Action dated Feb. 1, 2011 issued in corresponding Japanese Patent Application No. 2008-557238 (3 pages).
English translation of Japanese Office Action dated Jun. 17, 2011 issued in corresponding Japanese Patent Application No. 2008-557238 (2 pages).

(Continued)

*Primary Examiner* — Raymond Addie
(74) *Attorney, Agent, or Firm* — Ostrolenk Faber LLP

(57) ABSTRACT

A device for operating a gearbox, which operating device comprises a operating rod, a shift finger connected to the operating rod, and at least two electric motors acting upon the operating rod, the rotors of the electric motors being arranged on the operating rod so that a first electric motor is adapted to moving the operating rod by linear movement in the axial direction of the operating rod along the axis (A) of the operating rod and thus controls the lateral travel of the shift finger, and a second electric motor is adapted to effecting rotary movement to turn the operating rod about the axis (A) of the operating rod and thus controls the longitudinal travel of shift finger, when the respective electric motors are energized.

6 Claims, 4 Drawing Sheets

| FOREIGN PATENT DOCUMENTS | | |
|---|---|---|
| JP | 8-70568 | 3/1996 |
| JP | 61-161952 | 7/1996 |
| JP | 2002-257231 | 9/2002 |
| JP | 2002-257232 | 9/2002 |

OTHER PUBLICATIONS

Supplementary European Search Report dated Jul. 18, 2011 issued in corresponding European Patent Application No. EP 07709514.

* cited by examiner

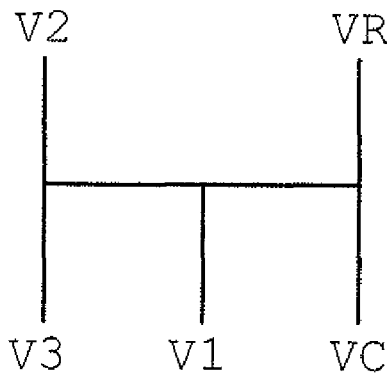
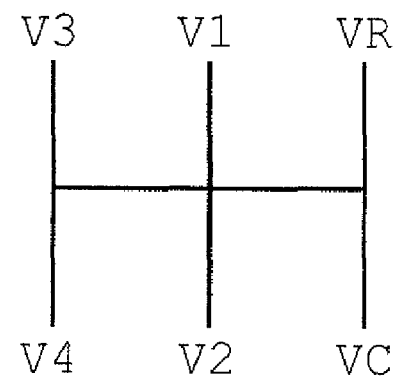
Fig. 4a                           Fig. 4b
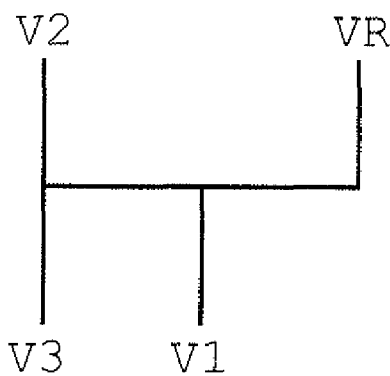
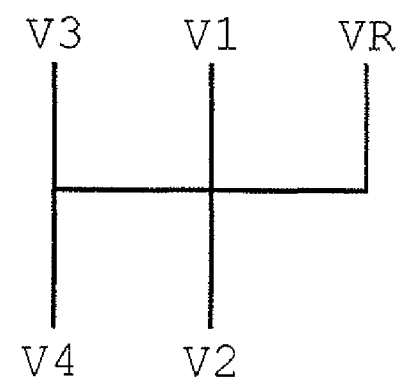
Fig. 4c                           Fig. 4d

ARRANGEMENT FOR THE CONTROL OF A GEAR BOX

CROSS REFERENCE TO RELATED APPLICATION

The present application is a 35 U.S.C. §§371 national phase conversion of PCT/SE2007/050123, filed 1 Mar. 2007, which claims priority of Swedish Application No. 0600476-6, filed 3 Mar. 2006. The PCT International Application was published in the English language.

TECHNICAL FIELD

The present invention relates to a device for operating a gearbox.

BACKGROUND OF THE INVENTION

A known practice in vehicles is to arrange in a gearbox situated between the vehicle's engine and its powered wheels a device for operating the gearbox, which operating device comprises an operating rod and a shift finger firmly connected to the operating rod. The various gears in the gearbox are engaged and disengaged by moving the shift finger between various specified gear positions. The shift finger is usually moved in a conventional manner along an H-shaped grid where the crossbar of the H corresponds to a neutral position of the gearbox and the arms of the H correspond to the various specified gear positions. The H usually has four to six arms extending at right angles to its crossbar. The fact that the vehicle may be equipped with more than one gearbox connected in series makes it possible for more than four to six gear positions to be reached despite a gearbox having only four to six gear positions. The shift finger is moved along the H-shaped grid by a first cylinder adapted to moving the operating rod and the shift finger connected to the operating rod in the direction of the crossbar when the gearbox is in a neutral position, by the cylinder effecting movements of the shift finger via a pneumatic duct system. In other words, this cylinder controls the shift finger's lateral travel. When the shift finger is positioned in the arm corresponding to the specified gear which is to be engaged, the linear movement along the crossbar is halted and a second cylinder is adapted to rotating the operating rod about its axis, usually by approximately 30° from a central position at which the shift finger is oriented at right angles to the plane of the H, so that the shift finger moves transverse to the direction of the operating rod to a position on one of the arms whereby the desired gear is engaged by the shift finger pushing a shaft situated along said arm, i.e. this cylinder controls the shift finger's longitudinal travel. The gears in the gearbox are thus engaged and disengaged. The two cylinders are usually powered pneumatically by the vehicle's ordinary compression system.

A problem with existing operating devices is that the air pressure in the vehicle's ordinary compression system varies in different situations, with the result that the control of the shift finger is not effected at exactly the same pressure each time. Moreover, pneumatic systems are difficult to regulate, since the air is compressed when it enters the cylinder before the cylinder's piston moves, thereby making it difficult to control the shift finger. It is therefore necessary to provide systems for monitoring and comparing the shift finger's existing position with its expected position in the H-shaped grid.

SUMMARY OF THE INVENTION

The problem of pneumatic systems being difficult to regulate because the air is compressed when it enters a cylinder before the cylinder's piston moves, thereby making it difficult to control the shift finger, is solved according to the invention by providing a device for operating a gearbox comprising two motors for moving the rod, one to move it axially and the other to rotate it. Particularly, the motors are disclosed as electric motors.

This device for operating a gearbox achieves the advantage of providing an operating device which can be controlled very exactly because the electric voltage applied to an electric motor gives rise to a specified torque.

BRIEF DESCRIPTION OF THE DRAWINGS

The invention is explained in more detail below with reference to the attached drawings, which use the same reference notations for similar parts, and in which:

FIGS. 4a-d depict schematically some examples of H-shaped gearchange grids for a shift finger.

DESCRIPTION OF PREFERRED EMBODIMENTS

Figure 1:
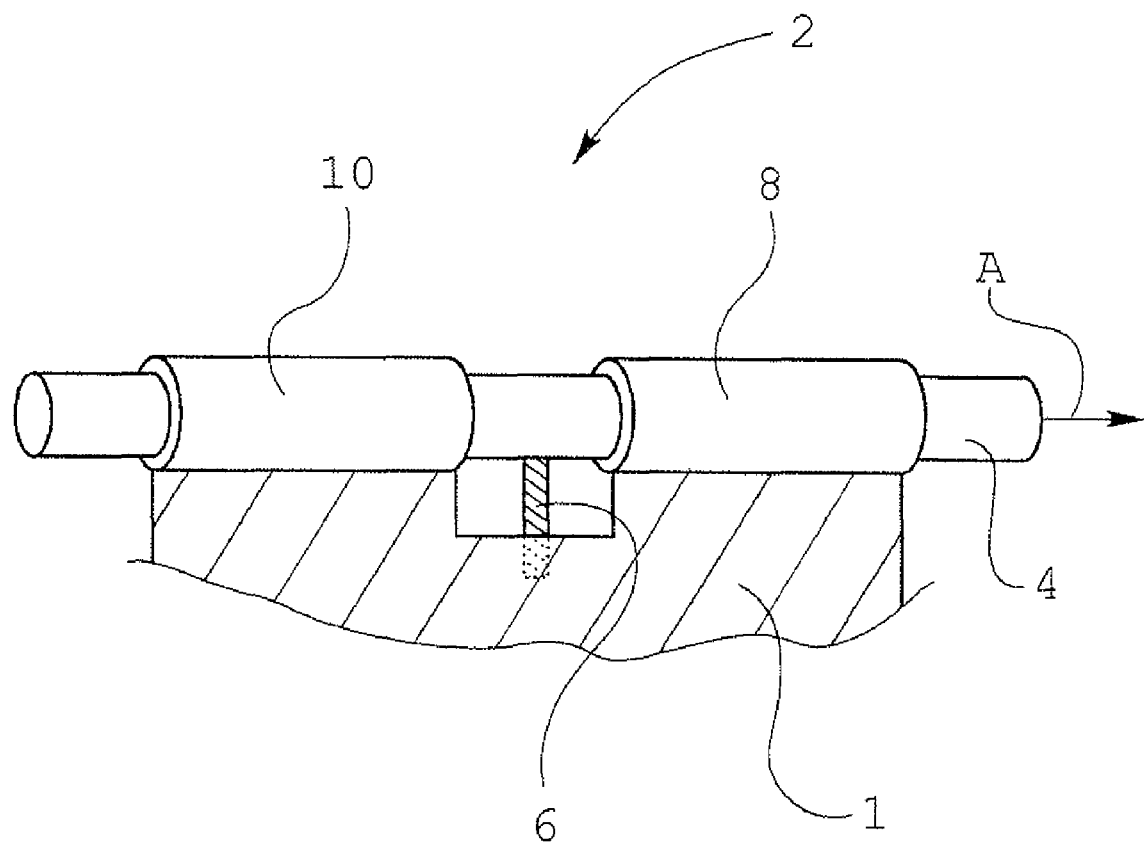
FIG. 1 depicts schematically a first embodiment of a device for operating a gearbox according to the invention.

FIG. 1 depicts schematically a first embodiment of a device for operating a gearbox 1 according to the invention. The operating device 2 comprises a operating rod 4, a shift finger 6 connected to the operating rod 4 and at least and preferably two electric motors 8,10 acting upon the operating rod 4. The electric motors 8,10 are arranged along, or more precisely surrounding, the operating rod 4. The first electric motor 8 is adapted to moving the operating rod 4 in linear movement in the axial direction of the operating rod 4 along the axis A of the operating rod 4 and thus controls the lateral travel of the shift finger 6. The second electric motor 10 is adapted to effecting rotary movement to turn the operating rod 4 about the axis A of the operating rod 4 and thus control the longitudinal travel of the shift finger 6. The first electric motor 8 is preferably a permanently magetized linear motor and the second electric motor 10 is preferably a permanently magetized AC motor or a permanently magetized DC motor. The motors may alternatively be linear motors, AC or DC, equipped with rotor windings, but permanently magetized motors are preferable because they need no rotor windings and because permanently magetized motors have fixed positions when not energized, which is an advantage in the use of motors for positioning purposes in that it simplifies position determination, so the invention is described below with permanently magetized motors.

Figure 2:
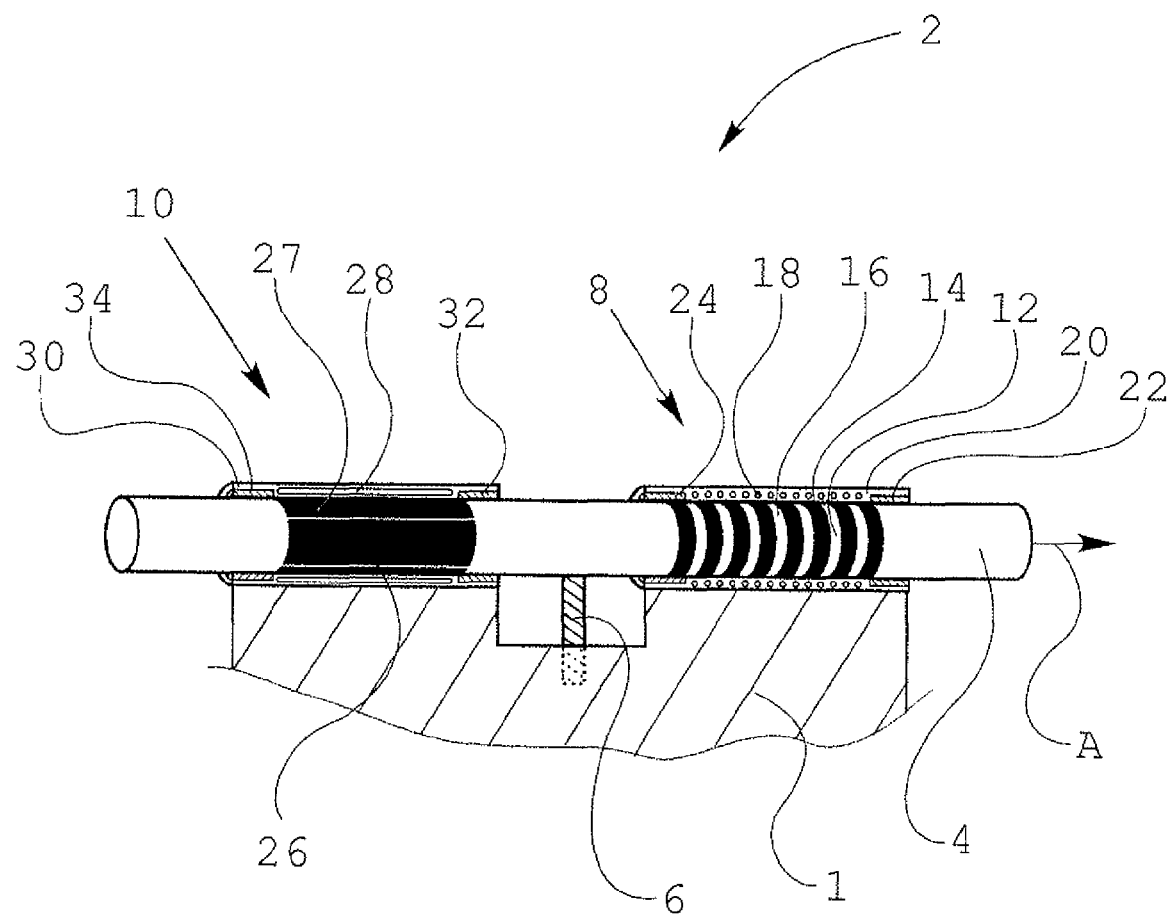
FIG. 2 depicts schematically a partly cutaway view of a device for operating a gearbox according to FIG. 1.

FIG. 2 depicts schematically a partly cutaway view of a device for operating a gearbox 1 according to FIG. 1. As previously mentioned, the first electric motor 8 is a linear motor. This linear motor comprises in this embodiment a rotor 12 provided with permanent magnets 14,16 with alternating polarity (north and south alternately, see FIG. 2). The rotor 12 is arranged on the rotor shaft which in this embodiment is the operating rod 4, i.e. the rotor 12 is arranged on the operating rod 4. The first electric motor 8 further comprises a field winding 18 in a stator housing 20, which stator housing 20 may be supported relative to the operating rod 4 by plain bearings 22,24, i.e. the operating rod 4 passes through the stator housing 20 of the field winding 18 and is therefore surrounded by the field winding 18. Energization of the field winding 18 will therefore cause the operating rod 4, and hence the shift finger 6, to perform linear movements in the axial direction of the operating rod 4 to and fro along the axis A of the operating rod 4.

As previously mentioned, the second electric motor 10 is a preferably permanently magnetized AC motor or a preferably permanently magnetized DC motor. The second electric motor 10 is in this embodiment a permanently magnetized electric motor and therefore comprises in this embodiment a rotor 26 provided with permanent magnets 27 with a single polarity (north in this embodiment). The rotor 26 is arranged on the rotor shaft which in this embodiment is the operating rod 4, i.e. the rotor 26 is arranged on the operating rod 4. The second electric motor 10 further comprises a field winding 28 in a stator housing 30, which stator housing 30 is supported relative to the operating rod 4 by plain bearings 32,34, i.e. the operating rod 4 passes through the stator housing 30 of the field winding 28 and is therefore surrounded by the field winding 28. Energization of the field winding 28 will therefore cause the operating rod 4, and hence the shift finger 6, to perform rotational movements about the axis A of the operating rod 4.

According to the invention, the first electric motor 8 and the second electric motor 10 are thus arranged along, more precisely surrounding, the operating rod 4 so that the operating rod 4 constitutes the rotor shaft of both motors. The problem when the first electric motor 8 and the second electric motor 10 are coupled together in this way, i.e. with the same shaft, viz. the operating rod 4, being used as the rotor shaft of both motors, is that a rotor shaft which runs through an ordinary electric motor can only rotate about the rotor shaft but not move in the axial direction of the rotor shaft, since the rotor and the stator in such an electric motor are mutually assembled in such a way as not to allow axial movement of the rotor relative to the stator, which are axially locked relative to one another in an electric motor housing. The invention solves this problem by the operating rod 4 being supported by plain bearings 32,34 relative to the stator housing 30 of the second electric motor 10 containing the field windings 28, whereby the stator housing 30 can move in the axial direction A of the rotor shaft, i.e. the operating rod 4, so that the rotor 26, which is here provided with permanent magnets 27, will move outside the stator housing 30 and hence partly out of contact with the field windings 28 when the operating rod 4 is caused to move in its axial direction A. The smaller the proportion of the rotor 26 which is within the field winding 28, the lower the efficiency of the second electric motor 10, but the latter's efficiency will be sufficient to enable it to move the operating rod 4 in its axial direction and hence operate the gearbox 1. The smaller the proportion of the rotor winding 12 which is within the field winding 28 when the operating rod 4 is caused to move in its axial direction A, the smaller likewise the efficiency of the first electric motor 8, but here again the latter's efficiency will be sufficient to enable it to move the operating rod 4 in its rotational direction and hence operate the gearbox 1. It is thus possible for both the first electric motor 8 and the second electric motor 10 to have the same shaft as their rotor shaft, i.e. for the operating rod 4 to be the rotor shaft of both the first electric motor 8 and the second electric motor 10. The second electric motor 10 is preferably an AC motor or a DC motor.

Figure 3:
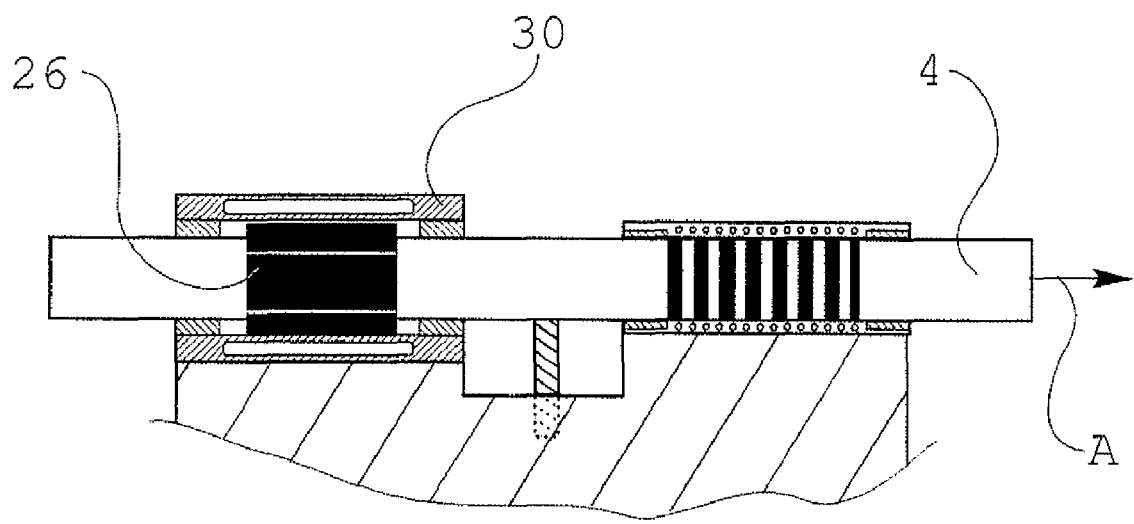
FIG. 3 depicts schematically a partly cutaway view of a second embodiment of a device for operating a gearbox according to the invention.

FIG. 3 depicts schematically a partly cutaway view of another embodiment of a device for operating a gearbox according to the invention. The difference relative to the embodiment depicted in FIG. 2 is that a thicker rotor 26 is arranged in a stator housing 30 which is longer than the rotor 26, i.e. the rotor 26 can only move within the stator housing 30 according to this embodiment. The result is greater torsional force and a limited mobility of the stator housing 30 in the axial direction of the operating rod 4 but no need to increase the diameter of the operating rod 4.

FIGS. 4a-4d depict schematically some examples of H-shaped gearchange grids for the shift finger. The notations used are VR for reverse gear position, VC for low gear position and V1-V4 for normal gear positions for travelling forwards.

A device for operating a gearbox includes an operating rod, a shift finger connected to the operating rod, and at least two electric motors acting upon the operating rod. The rotors of the electric motors are arranged on the operating rod so that a first electric motor is operable to move the operating rod by linear movement in the axial direction of the operating rod along the axis of the operating rod and thus controls the lateral travel of the shift finger and so that a second electric motor is operable to effect rotary movement to turn the operating rod about the axis of the operating rod and thus controls longitudinal travel of the shift finger, when the respective electric motors are energized.

The invention claimed is:

1. An operating device for operating a gearbox, the device comprises:
   an operating rod, a shift finger connected to and movable with the operating rod
   at least two electric motors acting upon the operating rod, respective rotors of the electric motors are arranged on the operating rod,
   a first of the electric motors being operable to move the operating rod by linear movement in an axial direction of the operating rod along an axis of the operating rod wherein the rod is operable for control lateral travel of the shift finger with the rod, and
   a second of the electric motors being operable to effect rotary movement to turn the operating rod about the axis of the operating rod and wherein the rod is operable to control longitudinal travel of the shift finger, when the respective electric motors are energized.

2. A device for operating a gearbox according to claim 1, wherein the first electric motor is a permanently magnetized linear motor and the second electric motor is a permanently magnetized AC motor or a permanently magnetized DC motor.

3. A device for operating a gearbox according to claim 2, wherein the first electric motor comprises a rotor winding provided with permanent magnets with alternating polarity.

4. A device for operating a gearbox according to claim 3, wherein the first electric motor further comprises a stator housing, and a field winding in the stator housing, plain bearings supporting the stator housing relative to the operating rod, whereby energization of the field winding causes the operating rod to perform linear movements in the axial direction of the operating rod to and fro along the axis of the operating rod.

5. A device for operating a gearbox according to claim 2, wherein the second electric motor comprises a rotor provided with permanent magnets of a single polarity.

6. A device for operating a gearbox according to claim 5, wherein the second electric motor further comprises a stator housing, a field winding in the stator housing, plain bearings supporting the stator housing relative to the operating rod, whereby energization of the field winding causes the operating rod to perform rotational movements about the axis of the operating rod.

* * * * *